G. W. Cotton,
Steam-Engine Piston.
N° 17,200.      Patented May 5, 1857.
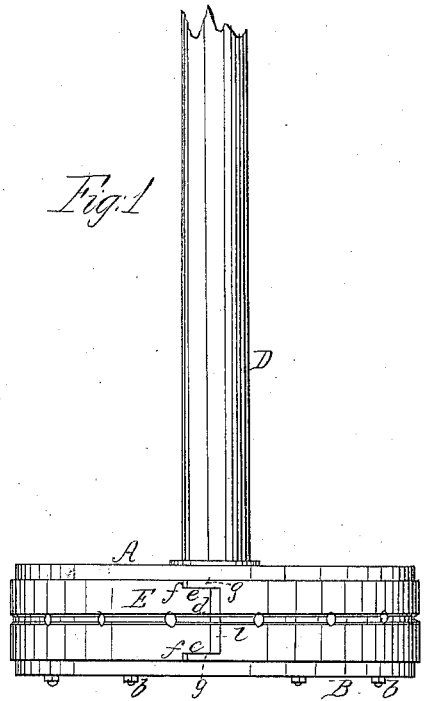
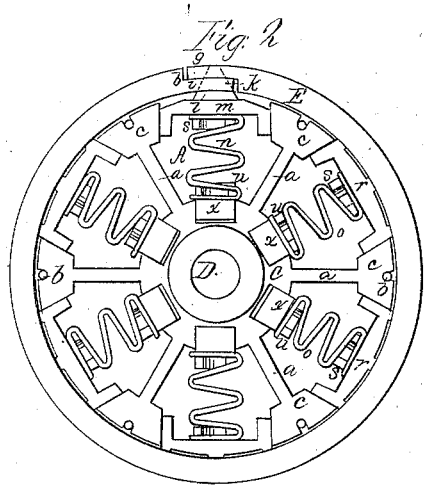

UNITED STATES PATENT OFFICE.

GEO. W. COTTON, OF ST. LOUIS, MISSOURI.

METAL-PACKED PISTON FOR STEAM-ENGINES.

Specification of Letters Patent No. 17,200, dated May 5, 1857.

*To all whom it may concern:*

Be it known that I, GEORGE W. COTTON, of the city of St. Louis and State of Missouri, have invented a certain new and useful Improvement in Metallic-Packed Piston-Heads for Steam and other Engines, of which the following is a full, clear, and exact description, reference being had to the accompanying drawings, which form part of this specification, and in which—

Figure 1 represents a side or edge view of a piston head with its rod in part; and Fig. 2 an inverted plan or face view of the interior of the piston, the outer disk or follower being removed.

My improvement has reference to that class of piston heads in which a single split or divided metallic ring is made to form the packing. It has long been a desideratum to make this—the simplest form of metallic packing—as steam tight and perfect in its flexibility all around the head as the more complicated many ringed or divided segmental packing, that, by reason of their many joints, score and cut the cylinder in which the piston works. This desideratum my improvement accomplishes.

In carrying out my improvement I necessarily employ many details which, of themselves, are common to other piston heads employing metallic packing, such as separate and independent interior springs, either spiral or other, acting upon sliding blocks to expand the packing, as in McDowall's and other segmental packed pistons, and the V or wedge filling, urged by spring pressure from within, to the joint or break in the packing, as in Barton's and other pistons; but the relative arrangement and use of these devices in combination with other parts or peculiarities of construction, to make a tight and perfect single ring packing as before mentioned, differs in my improvement from either these, the Cartwright, or any single ring packing that I am aware of.

To enable others skilled in the art to make and use my improvement, I shall now proceed to describe the several parts of it in detail.

The head is made up of two disks (A, B) with a central block (C) cast to one of the disks and radial arms (*a*) branching outward from the central block. The piston rod (D) is secured to the head in the usual or any suitable manner, and the one disk (B) made movable at pleasure and held to its place by screws (*b*). The arms (*a*) have fixed block terminations (*c*), around which the packing ring (E) is arranged. This packing ring (E) occupies the whole depth between the two disks (A B), is of equal thickness or thereabout, and has a single joint or break made in it as follows: Firstly, a cross division or split (*d*), not extending the whole depth of the packing but to within a short distance of either edge which forms the boundary of its depth, and terminating at such points in splits (*e*) at right angles to the first named split and running in the same directions as each other and parallel to the annular edges of the packing for a given distance, where the division is continued by short branch right angled splits (*f*) extending to and through the annular edges of the packing. See Fig. 1. Following up the division line, or last named splits (*f*),—see Figs. 1 and 2,—the cut, for the depth of the tongues (*g*), on either outer side or edge of the packing, is run by a cross division (*h*) half way through the thickness of the packing, where the cut is continued by splits (*i*) running concentrically to the packing and backwardly or toward the first named split (*d*) for the same distance or thereabout beyond as the tongues (*g*) project along the outside face of the packing, when the cut is turned or continued inward leaving tongues (*k*) that are overlapped by the outer and first named tongues (*g*). The ends of the packing thus formed are, for the depth of the first named cross cut (*d*), beveled to receive within them a V or wedge (*l*) which forms a close fit within said ends of the packing and protrudes from within, into or through the main cross cut (*d*). This wedge (*l*) is attached to or forms part of a sliding block (*m*), within one of the spaces formed by two of the radial arms (*a*) in the head, and pressed outward to unfold or extend the packing, through its wedge (*l*) acting against the beveled ends of the packing, by a spiral spring (*n*), while other similar springs (*o*), arranged within the other spaces formed by the other several fixed arms (*a*), urge a series of sliding stretchers (*r*) against the ring to stretch and expand it at sundry and equal points around the packing ring.

Both the stretchers (*r*) and wedge sliding block (*m*) should have strictly a radial play or action, and while the stretchers (r) exert a direct radial thrust at various points around the main surface of the packing and where the packing is stiffest, the wedge (l) of the sliding block (m) has its outward thrust or force expended on the ring at its reduced ends where it is most liable to spring outwardly, only slightly radially as compared with the direct thrust of the stretchers, a large proportion of the force of the wedge being directed to unfold the packing in an annular course, and these two actions of the stretchers and wedge, combined, give to the single ring packing a tolerably equal or universal flexibility all around, at the stiffest as well as at the weakest points, while leakage at the joint of the packing is, by the construction of it as described, effectually prevented.

To insure the necessary radial action of the wedge sliding block and stretchers, and to prevent twist or binding of said block and stretchers, both in the operation of the piston when at work and in setting up one or more springs as they weaken or the packing at a certain point or points require it, not only have the stretchers (r) and sliding block (m) radial sliding ways or surfaces provided them between the fixed block terminations (c), but said block and stretchers are further held against twist or binding and kept true to their radial thrust, in a soft and easy but positive manner, by the spiral springs (n, o) loosely fitting on or over central projections (s) on the sliding block and stretchers, and tying said block and stretchers to a radial course, at the inner ends of the springs, which inner ends are similarly fitted on or over central projections (u) of small sliding blocks or steps (x) let loosely into radial recesses in the central block (C) of the head. This arrangement affords great facility for tightening the thrust on the packing, in a true or radial direction, at any one or more points as required, by the simple introduction of a wedge behind any one or more of the sliding inner steps or blocks (x).

What I claim as new and useful herein, and desire to secure by Letters Patent, is—

1. The arrangement, for operation together on a single ring packing, of the wedge (l) with its sliding block (m) and radial stretchers (r), spiral springs (n o) and inner sliding steps or blocks (x) substantially as shown and described.

2. And I further claim forming the joint or break of the single ring packing with overlapping tongues (g k), and wedge (l) of less depth than the packing and fitting loosely between the beveled ends of the packing and the tongues (g k) at the top and bottom or opposite edges of the packing ring, as herein set forth.

In testimony whereof, I have hereunto subscribed my name.

GEO. W. COTTON.

Witnesses:
 WM. H. STONE,
 A. W. HOWE.